United States Patent
Maharyta

(10) Patent No.: US 9,310,953 B1
(45) Date of Patent: Apr. 12, 2016

(54) FULL-WAVE SYNCHRONOUS RECTIFICATION FOR SELF-CAPACITANCE SENSING

(71) Applicant: Cypress Semiconductor Corporation, San Jose, CA (US)

(72) Inventor: Andriy Maharyta, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 14/736,811

(22) Filed: Jun. 11, 2015

Related U.S. Application Data

(60) Provisional application No. 62/084,026, filed on Nov. 25, 2014.

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01); *G06F 2203/04101* (2013.01)

(58) Field of Classification Search
CPC ..... A01B 12/006; G06F 3/044; G06F 3/0416; G06F 2203/041
See application file for complete search history.

(56) References Cited

U.S. PATENT DOCUMENTS

| | | | |
|---|---|---|---|
| 6,873,277 B1 | 3/2005 | Frick | |
| 8,093,914 B2 | 1/2012 | Maharyta et al. | |
| 8,547,114 B2 | 10/2013 | Kremin | |
| 8,866,500 B2 | 10/2014 | Kremin et al. | |
| 2007/0262966 A1* | 11/2007 | Nishimura et al. | 345/173 |
| 2009/0167580 A1 | 7/2009 | Hutchinson | |
| 2012/0044193 A1 | 2/2012 | Peng et al. | |
| 2012/0256869 A1 | 10/2012 | Walsh et al. | |

FOREIGN PATENT DOCUMENTS

EP 1665544 B1 11/2008

* cited by examiner

*Primary Examiner* — Charles V Hicks
(74) *Attorney, Agent, or Firm* — Lowenstein Sandler LLP

(57) ABSTRACT

An apparatus and method to measure a self-capacitance of a capacitive sense array is described. The apparatus includes a first integrating capacitor, a first modulator, a second integrating capacitor, and a second modulator. The first modulator is operatively coupled to the first integrating capacitor. The second modulator is operatively coupled to the second integrating capacitor. The first modulator in conjunction with the first integrating capacitor and the second modulator in conjunction with the second integrating capacitor measure a self-capacitance of a capacitive-sense array by performing a full-wave synchronous rectification.

20 Claims, 11 Drawing Sheets

US 9,310,953 B1

FULL-WAVE SYNCHRONOUS RECTIFICATION FOR SELF-CAPACITANCE SENSING

RELATED APPLICATIONS

This application claims the benefit of U.S. Provisional Application No. 62/084,026, filed Nov. 25, 2014, the entire contents of which are incorporated by reference herein.

TECHNICAL FIELD

The disclosure relates to the field of capacitance sensing systems, in particular sensing self-capacitance of a capacitance-sense array.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs and other similar mechanical user interface controls. The use of a capacitive sense element, such as an electrode or pair of electrodes, allows for the elimination of complicated mechanical switches and buttons, providing reliable operation under harsh conditions. In addition, capacitive sense elements are widely used in modern customer applications, providing new user interface options in existing products. Capacitive sense elements can range from a single button to a large number arranged in the form of a capacitive-sense array for a touch-sensing surface.

Transparent touch screens that utilize capacitive-sense arrays are ubiquitous in today's industrial and consumer markets. They can be found on cellular phones, GPS devices, set-top boxes, cameras, computer screens, MP3 players, digital tablets, and the like. The capacitive-sense arrays work by measuring the capacitance of a capacitive sense element, and looking for a delta in capacitance indicating a touch or presence of a conductive object. When a conductive object (e.g., a finger, hand, or other object) comes into contact or close proximity with a capacitive sense element, the capacitance changes and the conductive object is detected. The capacitance changes of the capacitive touch sense elements can be measured by an electrical circuit. The electrical circuit converts the measured capacitances of the capacitive sense elements into digital values.

There are two typical types of capacitance: 1) mutual capacitance where the capacitance-sensing circuit has access to both electrodes of the capacitor; 2) self-capacitance where the capacitance-sensing circuit has only access to one electrode of the capacitor where the second electrode is tied to a DC voltage level or is parasitically coupled to earth ground.

BRIEF DESCRIPTION OF THE DRAWINGS

The present invention is illustrated by way of example, and not of limitation, in the figures of the accompanying drawings.

DETAILED DESCRIPTION

Figure 1:
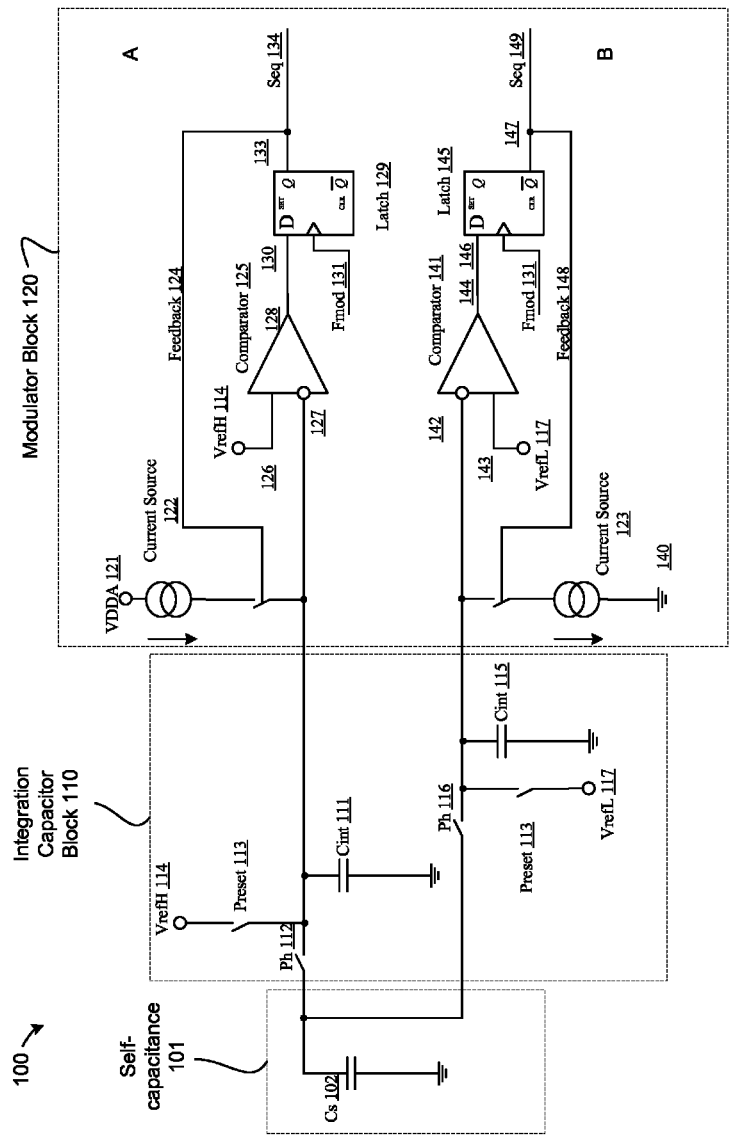
FIG. 1 is a circuit diagram illustrating a circuit for self-capacitance sensing, according to one implementation.

Apparatuses and methods of capacitance sensing are described. Capacitance sensing systems use various apparatuses and methods to sense and measure capacitance, such as the capacitance induced by a touch proximate a capacitive-sense array. Capacitance sensing techniques using half-wave rectification, i.e., measuring capacitance using a half-wave of a full-wave signal, may have low immunity to low frequency noise (e.g., 50 Hz-20 kHz). The low frequency noise may be power line noise (e.g., 50 Hz-60 Hz) and/or audio noise, for example noise from a speaker wire. As a result, capacitance measurements indicating a touch may be obscured and/or capacitance measurements indicating false touches may be generated.

In some embodiments, the present disclosure addresses the above-mentioned and other deficiencies by measuring a self-capacitance of a capacitive-sense array by performing a full-wave synchronous rectification using a two integrating capacitors each associated with a modulator.

A full-wave signal may be a waveform including two consecutive half-waves. A half-wave of the full-wave signal may be approximately equal to the negative of the corresponding half-wave. For example, a sinusoidal wave signal centered about 0 on an X-Y axis with an amplitude (A and −A) includes a positive first half wave (0-180°) and a negative second half-wave (180°-360°). It should be appreciated that a full-wave may be the length of one period of a periodic waveform.

Full-wave synchronous rectification may refer to the use of both charge current and discharge current (each associated with a separate half-wave a full-wave signal) in continuous time (i.e., synchronous) to measure capacitance on, for example, a sense element (e.g., electrode) of a capacitive-sense array. For example, a charge current may be used by a modulator to generate a measurement indicative self-capacitance and a discharge current may be used by another modulator to generate another measurement indicative of the self-capacitance. In contrast, half-wave synchronous rectification may refer to the use of either charge current or discharge current (but not both) used to measure capacitance on a sense element.

In one embodiment, a self-capacitance sensing channel may be used to measure a self-capacitance of a capacitive-sense array. A self-capacitance sensing channel may be refer to all or part of the physical hardware (e.g., circuit hardware), signals, and software (e.g., firmware, logic, etc.) used to measure a self-capacitance of, for example, a capacitive-sense array. For example, a self-capacitance channel may include some, all, or none of a capacitive-sense array (e.g., corresponding electrode(s) of the capacitive-sense array), one or more integration capacitors, or circuitry including a capacitance-sensing circuit (which may include one or more modulators and/or converters). The capacitive sensing channel may include a first integrating capacitor and associated first modulator to measure the self-capacitance during a first half-wave of a full-wave signal. The capacitive sensing channel may also include a second integrating capacitor and associated second modulator to measure the self-capacitance during a second half-wave of the full-wave signal. The first measurement from the first integrating capacitor and first modulator and the second measurement from the second integrating capacitor and second modulator may be used to generate a digital value (e.g., count) representative of the self-capacitance of the capacitive-sense array.

FIG. 1 is a circuit diagram illustrating a circuit for self-capacitance sensing according to one implementation. Circuit 100 includes self-capacitance 101, integration capacitor block 110, and modulator block 120.

Self-capacitance 101 is a simplified model of the self-capacitance of capacitive-sense array (not shown). Integration capacitor block 110 (also referred to as a switched capacitor block) includes two integrating capacitors, Cint 111 and Cint 115. In one example, Cint 111 and Cint 115 may be external capacitors (e.g., external to a capacitance-sensing circuit) and measure approximately 1000 pF. In another example, Cint 111 and Cint 115 may be internal capacitors, for example capacitors integrated into an integrated circuit (IC). Integration capacitor block 110 also includes two reference voltage sources, VrefH 114 and VrefL 117. In one example, VrefH 114 may be a high reference voltage of 4.3V (when operating voltage is 5V) and VrefL 117 may be a low reference voltage of 0.7V (e.g., minimum operating voltage).

Integration capacitor block 110 further includes switches preset 113, Ph 112 (also referred to as Ph1 or Phase1), and Ph 116 (also referred to as Ph2 or Phase2). It should be noted that preset 113, Ph 112, and Ph 116 may be referred to as switches and/or the signals that control the corresponding switches. In one example, Ph 112 and Ph 116 may be non-overlapping switches. Non-overlapping switches may refer to a first switch (e.g., Ph 112) that is closed when the second switch (e.g., Ph 116) is open or a second switch (e.g., Ph 116) that is closed when the first switch (e.g., Ph 112) is open. Switch Ph 112 is operatively interposed between an electrode (e.g., self-capacitance Cs 102) of the capacitive-sense array and integrating capacitor Cint 111. Switch Ph 116 is operatively interposed between an electrode (e.g., the self-capacitance Cs 102) of the capacitive-sense array and the integrating capacitor Cint 115. Switch Ph 112 and switch Ph 116 alternately couple the integrating capacitor Cint 111 and the integrating capacitor Cint 115, respectively, to the self-capacitance Cs 102 during the full-wave signal. Each integrating capacitor, Cint 111 and Cint 115, is alternately coupled to self-capacitance Cs 102 during a different half-wave of the full-wave signal. In so doing, integrating capacitor Cint 111 samples a charge associated with the self-capacitance Cs 102 of the capacitive-sense array during a first half-wave of a full-wave signal. Integrating capacitor Cint 115 samples another charge associated with the self-capacitance Cs 102 of the capacitive-sense array during a second half-wave of the full-wave signal.

Modulator block 120 depicts an implementation of two sigma-delta modulators. It should be noted that a sigma-delta modulator is used for purposes of illustration, not for purposes of limitation. Other modulators may also be implemented in circuit 100, such as a charge balancing circuit. Modulator block 120 includes two modulators. The top modulator (also referred to as modulator A) corresponds to integrating capacitor Cint 111. The bottom modulator (also referred to modulator B) corresponds to integrating capacitor Cint 115. Modulator A and B may be similar circuits. Modulator A includes a current source 122 coupled to source voltage VDDA 121 (which may be the operational voltage of the circuit 100). Modulator A also includes comparator 125. Comparator 125 includes comparator input 126 and comparator input 127 and comparator output 128. Comparator input 126 is coupled to reference voltage VrefH 114. Modulator also includes latch 129. Latch 129 includes latch input 130 fed by comparator output 128. Latch 129 is enabled by modulated signal Fmod 131 and includes latch output 133. Latch 129 generates a measurement Seq 134 corresponding to the self-capacitance Cs 102. Latch output 133 is connected in a feedback configuration (feedback 124) with current source 122 (i.e., a switch controlling current source 122). Feedback 124 controls a charge current to charge Cint 111 during a measuring phase. Modulator A measures a charge current (note: charge current may be from current source 122 charging Cint 111 back to VrefH 114) on the integrating capacitor Cint 111 to generate the measurement Seq 134. The measurement may be performed during a first half-wave of a full-wave signal (e.g., the charge current corresponding to a first half-wave of a full-wave signal) and while Cint 115 is sampling charge from self-capacitance Cs 102. The measurement may be indicative of the self-capacitance of the capacitive-sense array.

During the measurement phase integrating capacitor Cint 111 is disconnected from self-capacitance Cs 102. The voltage at Cint 111 may have changed during the previous sampling phase, the voltage change corresponding to the amount of charge shared between self-capacitance Cs 102 and integrating capacitor Cint 111. The voltage at Cint 111 is compared at comparator 125 to VhrefH 114. Any difference between the two voltages triggers comparator 125 to output a signal, such as a pulse signal. The pulse signal is transmitted to latch 129, which if enabled, will generate a measurement Seq 134. The duty cycle of Seq 134 may be indicative of the amount of capacitance of self-capacitance Cs 102. When Seq 134 is high (e.g., Seq 134 may also be a pulse signal), Seq 134 is fed back to current source 122 in feedback 124. Seq 134 may turn on a digital switch so that current source 122 provides a charge current to integrating capacitor Cint 111. Current source 122 supplies a charge current (e.g., the charge current that is measured for a half-wave of the full-wave synchronous rectification) until the voltage at Cint 111 reaches VrefH 114. When the voltage at Cint 111 reaches VrefH 114, comparator 125 turns off, latch 129 responds by disabling measurement Seq 134 which turns off current source 122. It will be appreciated that a similar measurement phase may be performed by modulator B during the subsequent half-wave. It should also be appreciated that during the measurement phase performed by modulator A (performed for a half-wave), that a sampling phase may be performed by the bottom integrating capacitor Cint 115. The operations of the top circuit and bottom circuit may be subsequently alternated during the subsequent half-wave.

Modulator B includes a current source 123 (also referred to as current sink) coupled to device ground 140. Modulator B also includes comparator 141. Comparator 141 includes comparator input 142 and comparator input 143 and comparator output 144. Comparator input 143 is coupled to reference voltage VrefL 117. Modulator B also includes latch 145. Latch 145 includes latch input 146 fed by comparator output 144. Latch 145 is enabled by modulated signal Fmod 131 and includes latch output 147. Latch 145 generates a measurement Seq 149 corresponding to the self-capacitance Cs 102. Latch output 147 is connected in a feedback configuration (feedback 148) with current source 123 (i.e., a switch controlling current source 123). Feedback 148 controls a discharge current to discharge Cint 115 during a measurement phase. Modulator B measures the discharge current (note: discharge current may be from current source 123 discharging Cint 115 back to VrefL 117) on the integrating capacitor Cint 115 to generate the measurement Seq 149. The measurement may be performed during a second half-wave of a full-wave signal (e.g., the discharge current corresponding to a second half-wave of a full-wave signal) and while Cint 111 is sampling charge from self-capacitance Cs 102. The measurement may be indicative of the self-capacitance of the capacitive-sense array.

The measurements, Seq 134 and Seq 149 may be used to determine the self-capacitance Cs 102 of capacitive-sense array. Seq 134 and Seq 149 may be modulated signal whose duty cycle corresponds to the capacitance detected on self-capacitance Cs 102 (e.g., touch or no touch). A converter (not shown) may receive Seq 134 and Seq 149 from the output of modulator A and modulator B, respectively and convert the measurements into a digital value (e.g., count) representative of the self-capacitance Cs 102. Each measurement may be indicative of the self-capacitance Cs 102. To improve accuracy, the converter may take the average of many measurements (e.g., 1000) to determine a digital value representative of self-capacitance Cs 102. Examples of a converter are depicted with reference to FIGS. 6A and 6B.

All or part of circuit 100 may be considered a self-capacitance sensing channel. It should be noted that a capacitance-sensing circuit (not shown) may include one or more self-capacitance sensing channels to sense the self-capacitance of a capacitive-sense array. A capacitive-sense array may include a plurality of electrodes. Each electrode of a capacitive-sense array may have an associated self-capacitance.

Figure 2:
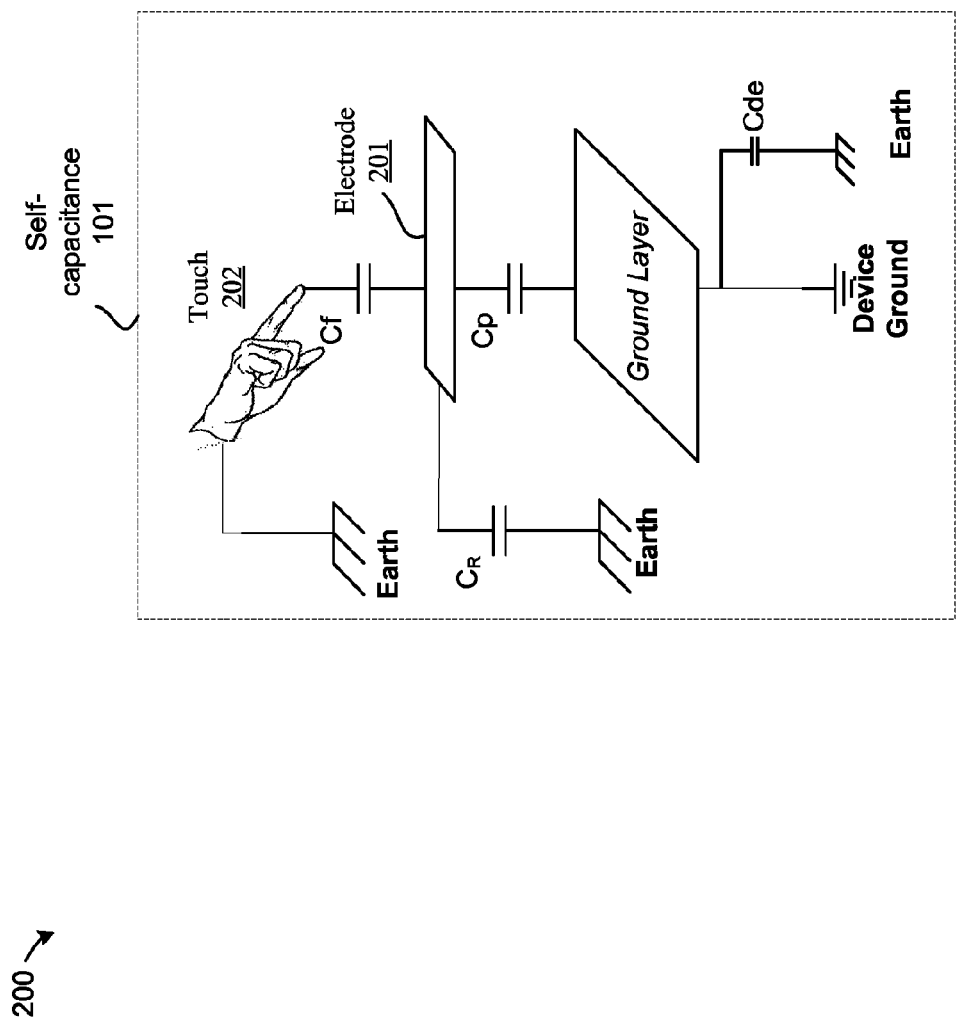
FIG. 2 is a circuit diagram illustrating a self-capacitance model of a capacitive-sense array, according to one implementation.

FIG. 2 is a circuit diagram illustrating a self-capacitance model of a capacitive-sense array, according to one implementation. Circuit 200 is a model of self-capacitance 101 (e.g., Cs 102) of FIG. 1. Electrode 201 may be an electrode (e.g., sense element) of a capacitive-sense array made of a conductive material. Self-capacitance 101 may include parasitic capacitance (Cp) connected to device ground, sensor capacitance (Cr) connected to Earth ground, finger capacitance (Cf) connected to earth ground, and device capacitance (Cde) connected to Earth ground. It should be noted that the ground layer may be absent in some device configurations, in which case parasitic capacitance (Cp) may be connected to device ground. As a touch 202 moves closer to electrode 201, finger capacitance (Cf) increases. As a touch 202 moves away from electrode 201, finger capacitance (Cf) decreases. Circuit 100 of FIG. 1 measures the aforementioned capacitance changes to detect a touch proximate the sense array.

Figure 3:
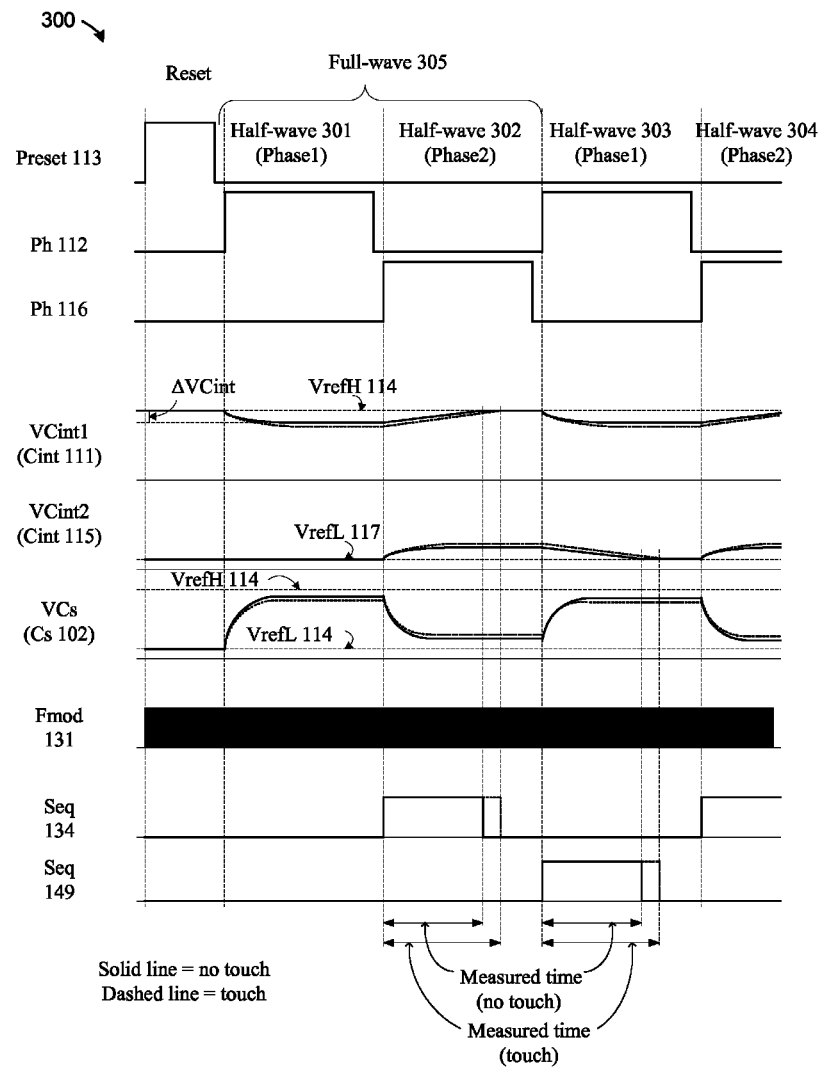
FIG. 3 is a waveform diagram illustrating operational waveforms of full-wave synchronous rectification in conjunction with the circuit of FIG. 1, according to one embodiment.

FIG. 3 is a waveform diagram illustrating operational waveforms 300 of full-wave synchronous rectification in conjunction with the circuit of FIG. 1, according to one embodiment. Full-wave 305 corresponds to the full-wave signal for switch Ph 112 or Ph 116 (e.g., illustrated as a square wave). Full-wave 305 includes two consecutive half-waves, half-wave 301 and half-wave 302 (also referred to as phase 1 and phase 2, respectively). Ph 112 and Ph 116 illustrate full-wave signals controlling switch Ph 112 and Ph 116, respectively. As illustrated the two signals for Ph 112 and Ph 116 are non-overlapping.

At reset, the signal for switch preset 113 is high and charges Cint 111 to VrefH 114 and charges Cint 115 to VrefL. For purposes of illustration, the following description will discuss half-wave 302 (phase 2) to illustrate the typical operation of both halves of circuit 100. At half-wave 302 (phase 2), modulator A measures a charge current on integrating capacitor Cint 111 until the voltage on Cint 111 reaches VrefH 114. As illustrated, the increased charge time (a function of the increased charge current and indicative of additional capacitance at self-capacitance Cs 102) indicates a touch proximate the sense element of the capacitive-sense array. Modulator A generates the measurement Seq 134 indicative of self-capacitance Cs 102. Also during phase 2, Cint 115 is connected to Cs 102 and samples a charge from self-capacitance Cs 102.

At half-wave 303 (phase 1), the roles of the two halves of the circuit are reversed. Cint 111 samples a charge on the self-capacitance Cs 102. During phase 1, Cint 115 is disconnected from the self-capacitance Cs 102 and modulator B measures a discharge current on Cint 115 until the voltage on Cint reaches VrefL 117. As illustrated, the increased charge time (a function of the increased charge current and indicative of additional self-capacitance Cs 102) indicates a touch proximate the sense element of the capacitive sense array. Modulator B generates measurement Seq 149 indicative the self-capacitance Cs 102. In one embodiment, an average of multiple measurements (e.g., 1000 measurements) may be calculated to determine a touch proximate the capacitive-sense array. As illustrated the operations may continue (e.g., synchronous) at half-wave 304 (phase2).

Fmod 131 may be a frequency lower or higher than the sensor excitation frequency (fs). In one embodiment, Fmod 131 is much greater than fs, as illustrated. Fs may be approximately equal to the signal frequency of the signal Ph 112 or Ph 116.

Several equations are provided below in order to help elaborate on circuit 100 of FIG. 1 and the associated operational waveforms 300 of FIG. 3.

$$V_{ex} \approx V_{refH} - V_{refL}$$

$$\text{If } C_{int} >> C_s (C_{int} > 100 \cdot C_s)$$

The excitation voltage (Vex) is approximately equal to the difference between VrefH (e.g., VrefH 114) and VrefL (e.g., VrefL 117). Cint is the integrating capacitor (e.g., Cint 111 or Cint 115) and Cs is the self-capacitance (e.g., Cs 102). The circuit (e.g., circuit 100) sensitivity (e.g., immunity to noise, like low frequency noise) may depend on Vex, the larger Vex the greater the circuits ability to reject noise. The circuit sensitivity may also depend on the relationship between Cs/Cint and ΔCs/Cs. The relationships may meet the below inequality.

$$C_{int} >> \Delta C_s \cdot C_s^2$$

ΔCs refers to the change in self-capacitance. Dmod is the duty cycle of a measurement such as Seq 134 and Seq 149 and is described in the following equation:

$$D_{mod} = f_z \cdot \frac{1}{I_{IDAC}} \cdot (V_{refH} - V_{refL}) \cdot C_s$$

Iidac may be the current (e.g., charge or discharge current over time) sourced or sunk by a current source, such as current source 122 and/or 123.

Figure 4:
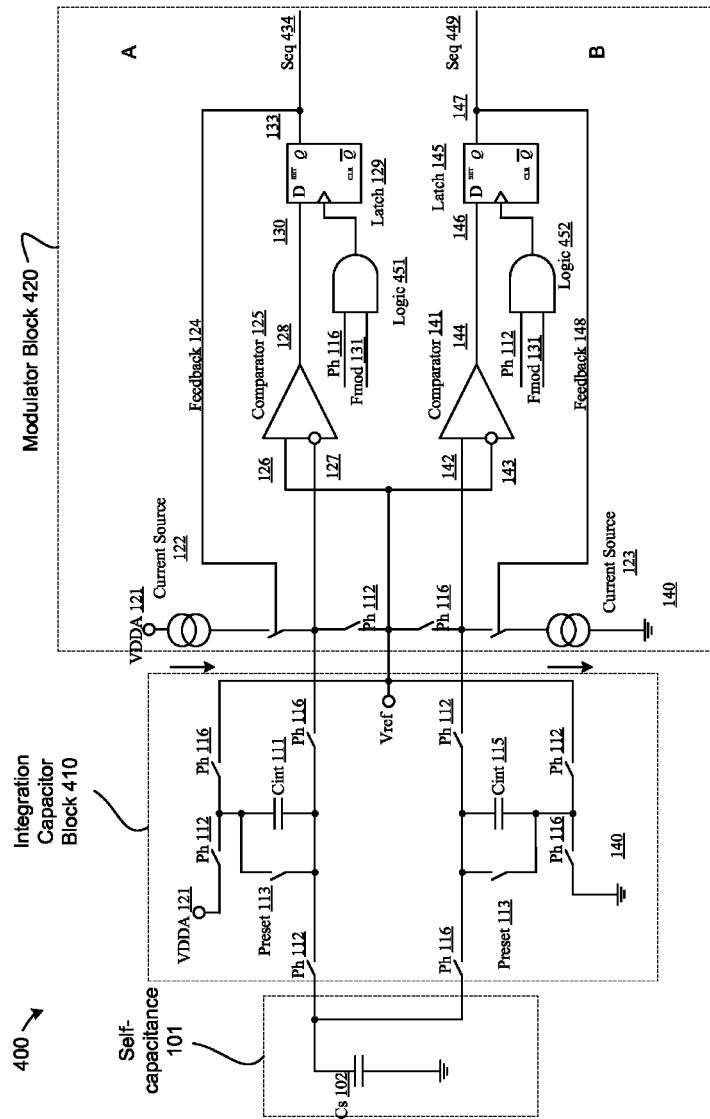
FIG. 4 is a circuit diagram illustrating a circuit for self-capacitance sensing, according to another implementation.

FIG. 4 is a circuit diagram illustrating a circuit for self-capacitance sensing according to another implementation. For purposes of illustration, the differences between circuit 400 and circuit 100 are described below. It should be noted that circuit 400 includes features similar to circuit 100 of FIG. 1. Accordingly, features of circuit 400 may be further described with reference to FIG. 1, above. Circuit 400 includes self-capacitance 101, integration capacitor block 410, and modulator block 420.

Circuit 400 operates in a similar manner as circuit 100 of FIG. 1. The circuit sensitivity of circuit 400 may be increasing by increasing the excitation voltage (Vex). In circuit 400, the excitation voltage may be the difference between the operating voltage (VDDA 121) and device ground 140, offering a larger excitation voltage than circuit 100.

It should be noted that circuit 400 includes logic 451 and logic 452 (e.g., AND logic gates). The input of logic 451 includes signals Ph 116 and Fmod 131. The output of logic 451 is connected to the enable input of latch 129. The input of logic 452 includes signals Ph 112 and Fmod 131. The output of logic 452 is connected to the enable the input of latch 145. Logic 451 enables latch 129 so that measurement Seq 434 is generated during the appropriate time (e.g., first half-wave), and not generated at other times. Similarly, logic 452 enables latch 145 so that measurement Seq 449 is generated during the appropriate time (e.g., second half-wave), and not generated at other times. In one embodiment, Vref may have a value of approximately VDDA/2. Alternatively, Vref may have other values.

Figure 5:
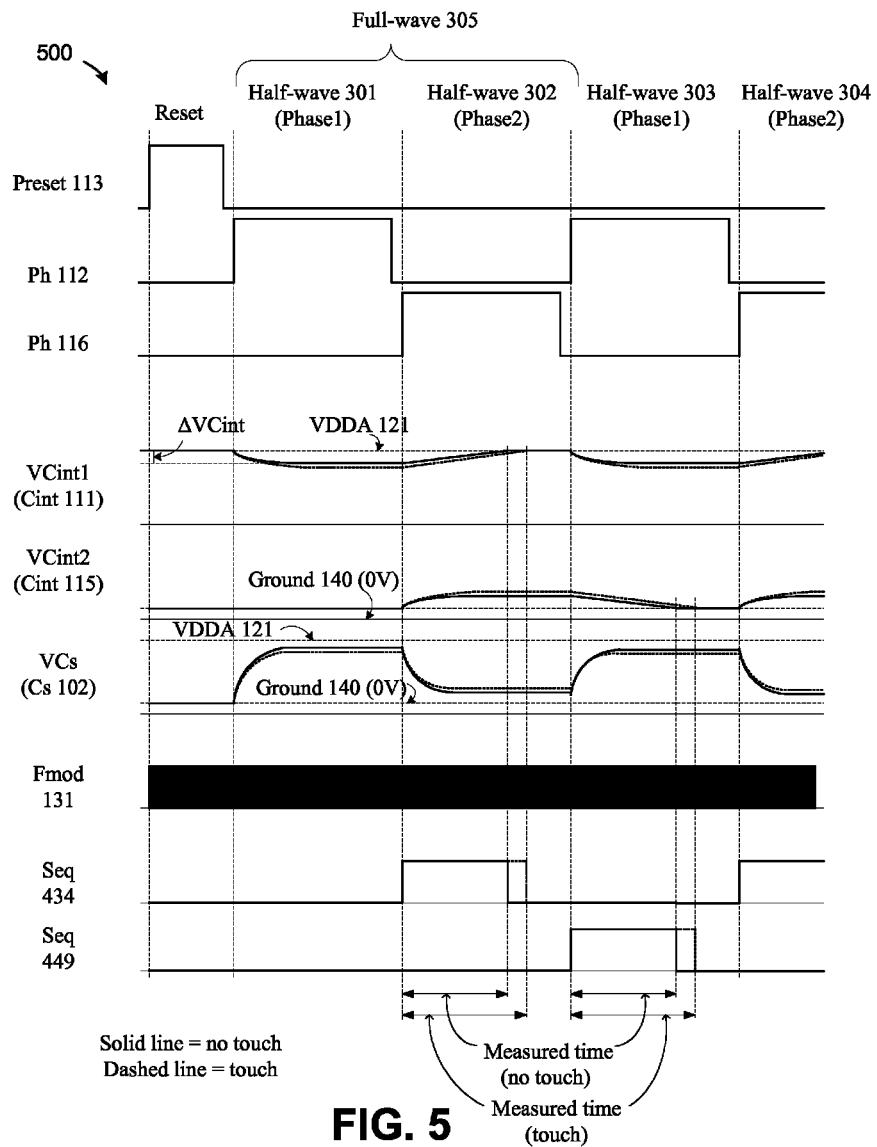
FIG. 5 is a waveform diagram illustrating operational waveforms of full-wave synchronous rectification in conjunction with the circuit of FIG. 4, according to one embodiment.

FIG. 5 is a waveform diagram illustrating operational waveforms 500 of full-wave synchronous rectification in conjunction with the circuit of FIG. 4, according to one embodiment. For purposes of illustration, the differences between operational waveforms 500 and operational waveforms 300 are described below. It should be noted that operational waveforms 500 includes features similar to operational waveforms 300 of FIG. 3. Accordingly, features of operational waveforms 500 may be further described with reference to FIG. 3, above.

It should be noted that the excitation voltage (Vex) of circuit 400 is larger than the excitation voltage of circuit 100. Accordingly, it should be noted that the voltage at integrating capacitor Cint 111 may approximate the operational voltage VDDA 121 and the voltage at integrating capacitor Cint 115 may approximate device ground 140 (0V).

Dmod, in reference to circuit 400 and operational waveforms 500, is the duty cycle of a measurement such as Seq 434 and Seq 449 and is described in the following equation:

$$D_{mod} = f_s \cdot \frac{1}{I_{IDAC}} \cdot V_{DDA} \cdot C_s$$

Fs is the excitation frequency. Iidac is the current to and from the current source. Vdda is the operation voltage such as VDDA 121, and Cs is the self-capacitance (e.g., Cs 102).

Figure 6:
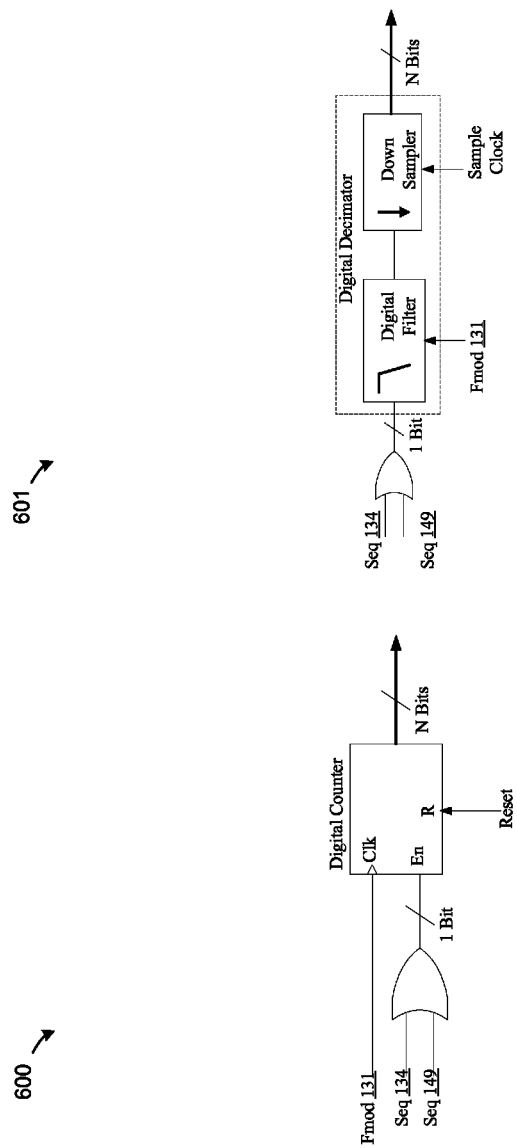
FIG. 6A is a circuit diagram illustrating a converter, according to one embodiment.
FIG. 6B is a circuit diagram illustrating a converter, according to another embodiment.

FIG. 6A is a circuit diagram illustrating a converter, according to one embodiment. FIG. 6B is a circuit diagram illustrating a converter, according to another embodiment. Converter 600 and converter 601 of FIGS. 6A and 6B, respectively, may receive measurements (e.g., Seq 134, 149, 434, 449, 934, and 949) from the modulator blocks of the circuits discussed above (e.g., circuit 100 with respect to FIG. 1 and circuit 400 with respect to FIG. 4) and below (e.g., circuit 900 with respect to FIG. 9). The measurements may be used to generate a digital value (e.g., count) representative of the self-capacitance of the capacitive-sense array.

Figure 7:
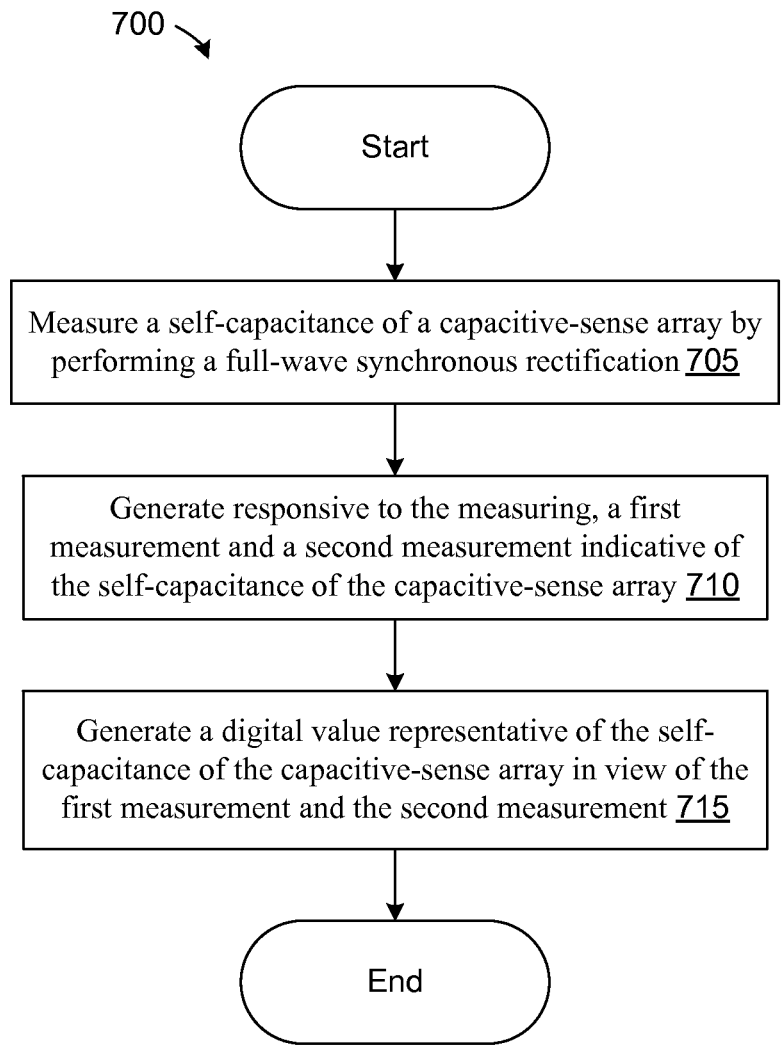
FIG. 7 illustrates a flow diagram of a method of performing full-wave synchronous rectification, according to one embodiment.

FIG. 7 illustrates a flow diagram of a method of performing full-wave synchronous rectification, according to one embodiment. The method 700 may be performed by processing logic that comprises hardware (e.g., circuitry, dedicated logic, programmable logic, microcode, etc.), software (such as instructions run on a processing device), or a combination thereof. The method 700 may be performed all or in part by capacitance-sensing circuit 1101 and/or full-wave synchronous rectification circuit 1121. Method 700 may be performed all or in part by the circuits discussed herein, such as circuit 100 with respect to FIG. 1, circuit 400 with respect to FIG. 4, converter 600 and 601 with respect to FIGS. 6A and 6B, and circuit 900 with respect to FIG. 9.

Method 700 begins at block 705 where processing logic performing the method measures a self-capacitance of a capacitive-sense array by performing a full-wave synchronous rectification. Full-wave synchronous rectification includes using a first integrating capacitor corresponding to a first modulator and a second integrating capacitor corresponding to a second modulator. Method 700 continues at block 710 where processing logic generates, responsive to the measuring, a first measurement and a second measurement indicative of the self-capacitance of the capacitive-sense array. Method 700 continues to block 715 where processing logic generates a digital value representative of the self-capacitance of the capacitive-sense array in view of the first measurement and the second measurement. The digital value may be generated by a converter coupled to the first and second modulators.

Figure 8:
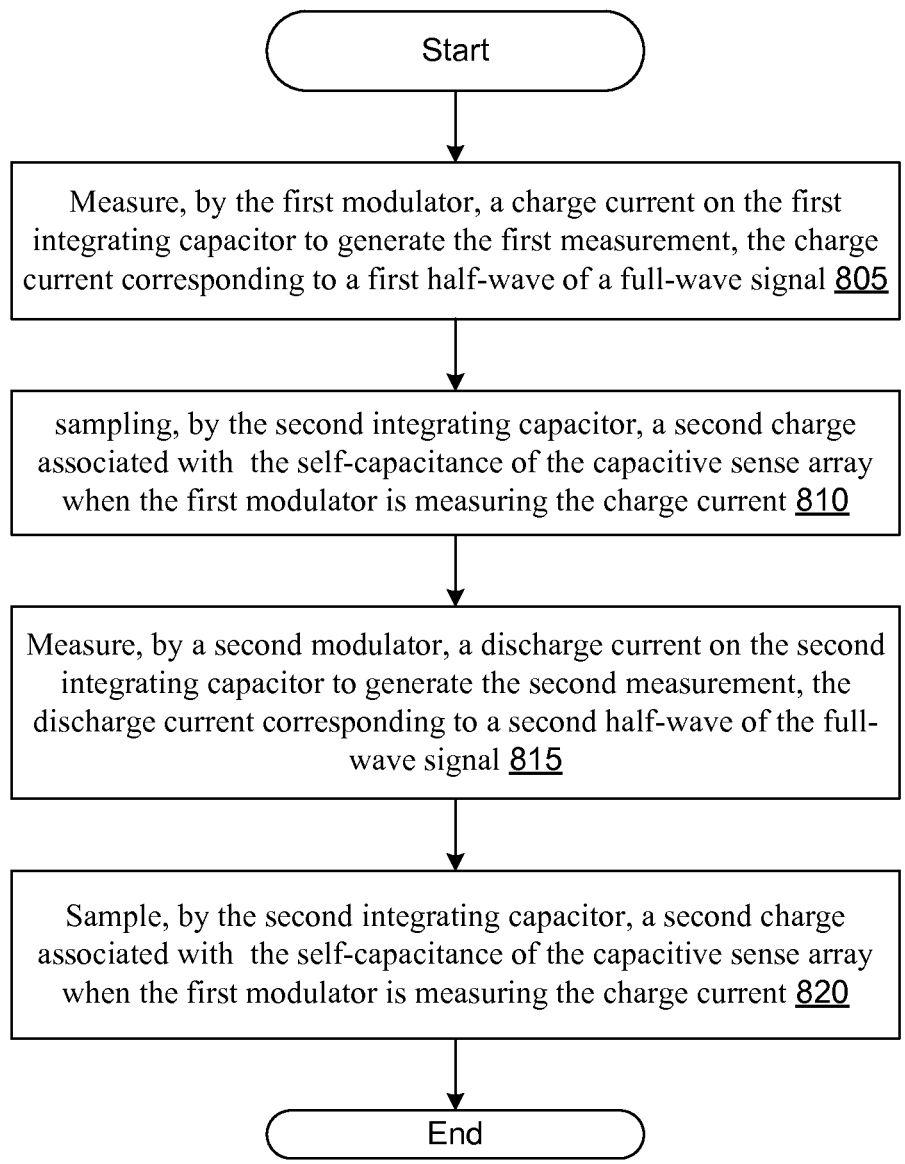
FIG. 8 illustrates a flow diagram of a method of performing full-wave synchronous rectification, according to another embodiment.

FIG. 8 illustrates a flow diagram of a method of performing full-wave synchronous rectification, according to another embodiment. The method 800 may be performed by processing logic that comprises hardware (e.g., circuitry, dedicated logic, programmable logic, microcode, etc.), software (such as instructions run on a processing device), or a combination thereof. The method 800 may be performed all or in part by capacitance-sensing circuit 1101 and/or full-wave synchronous rectification circuit 1121. Method 800 may be performed all or in part by the circuits discussed herein, such as circuit 100 with respect to FIG. 1, circuit 400 with respect to FIG. 4, converter 600 and 601 with respect to FIGS. 6A and 6B, and circuit 900 with respect to FIG. 9.

Method 800 begins at block 805 where processing logic performing the method measures, by the first modulator, a charge current on the first integrating capacitor to generate the first measurement. The charge current corresponding to a first half-wave of a full-wave signal. Method 800 continues at block 810 where processing logic samples, by the second integrating capacitor, a charge of the self-capacitance of the capacitive-sense array. The sampling may occur concurrently with the measuring described in block 805 (e.g., during a first half-wave of a full-wave signal). Method 800 continues in block 815 where processing logic measures, by a second modulator, a discharge current on the second integrating capacitor to generate the second measurement. The discharge current corresponds to a second half-wave of the full-wave signal. Method 800 continues at block 820 where processing logic samples, by the first integrating capacitor, a charge of the self-capacitance of the capacitive-sense array. The sampling may occur concurrently with the measuring of block 815 (e.g., during a second half-wave of the full-wave signal). Sampling may refer to charge sharing between the integrating capacitor and the self-capacitance.

Figure 9:
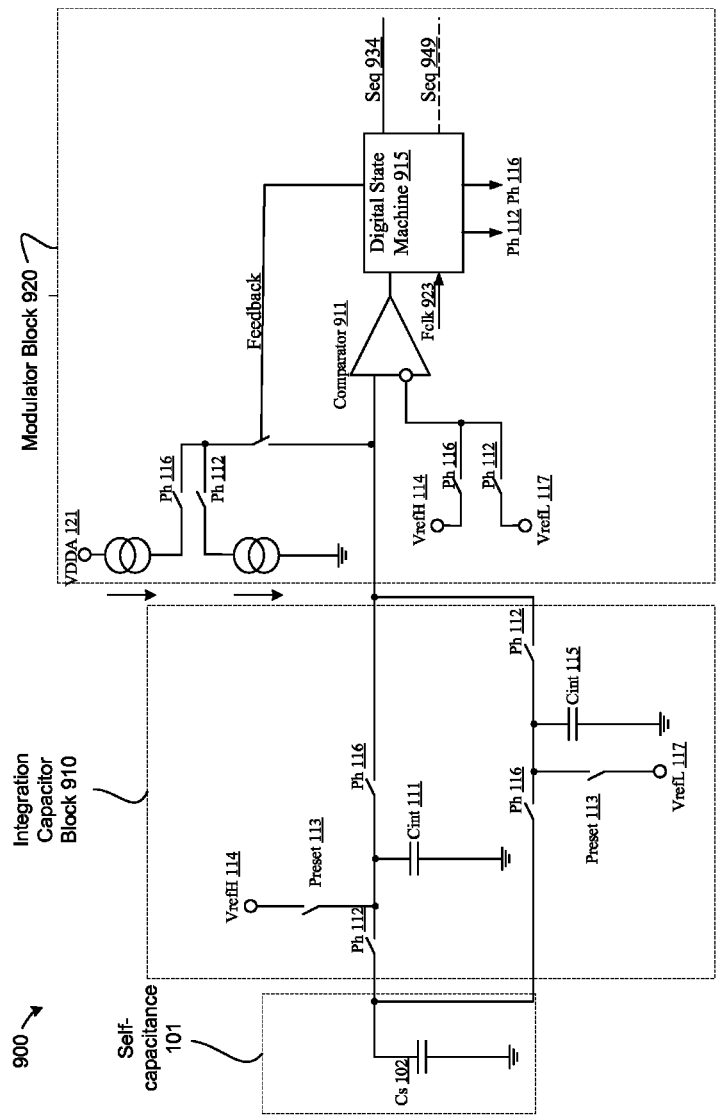
FIG. 9 is a circuit diagram illustrating a circuit for self-capacitance sensing, according to another implementation.

FIG. 9 is a circuit diagram illustrating a circuit for self-capacitance sensing, according to another implementation. For purposes of illustration, the differences between circuit 900 and circuit 100 and 400 are described below. It should be noted that circuit 900 includes features similar to circuit 100 and 400 of FIGS. 1 and 4, respectively. Accordingly, features of circuit 900 may be further described with reference to FIG. 1 and FIG. 4, above. Circuit 900 includes self-capacitance 101, integration capacitor block 910, and modulator block 920.

Circuit 900 may perform similar operations as described with respect to circuits 100 and 400. The circuit 900 includes one comparator, comparator 911. The output of comparator 911 feeds the input of digital state machine 915. Digital state machine 915 outputs measurements Seq 934 and Seq 949. The measurements are indicative of the self-capacitance Cs 102 and may be sent to a converter, such as converter 600 and 601 in reference to FIGS. 6A and 6B, respectively. Digital state machine 915 is enabled by a clock signal Fclk 923.

Figure 10:
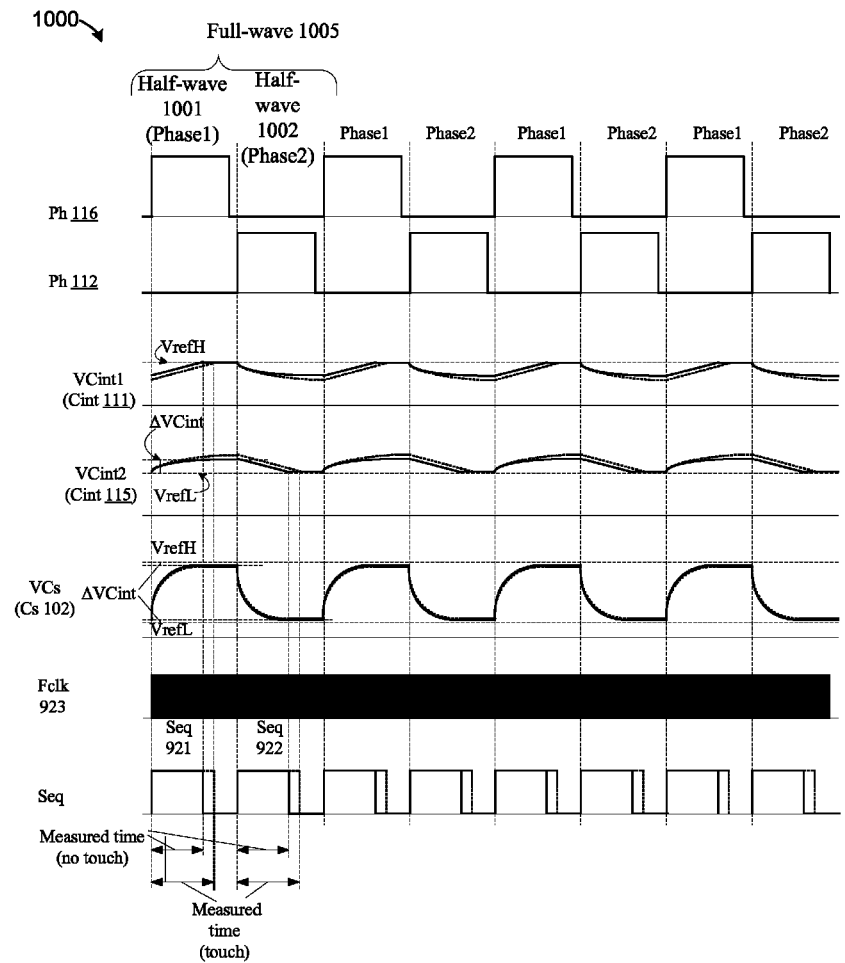
FIG. 10 is a waveform diagram illustrating operational waveforms of full-wave synchronous rectification in conjunction with the circuit of FIG. 9, according to one embodiment.

FIG. 10 is a waveform diagram illustrating operational waveforms 1000 of full-wave synchronous rectification in conjunction with the circuit of FIG. 9, according to one embodiment. For purposes of illustration, the differences between operational waveforms 1000 and operational waveforms 500 and 300 are described below. It should be noted that operational waveforms 1000 includes features similar to operational waveforms 300 in respect to FIG. 3 and operational waveforms 500 with respect to FIG. 5. Accordingly, features of operational waveforms 1000 may be further described with reference to FIG. 3 and FIG. 5, above.

Operational waveform 1000 includes full-wave 1005. Full-wave 1005 includes half-wave 1001 (phase1) and half-wave 1002 (phase2).

Figure 11:
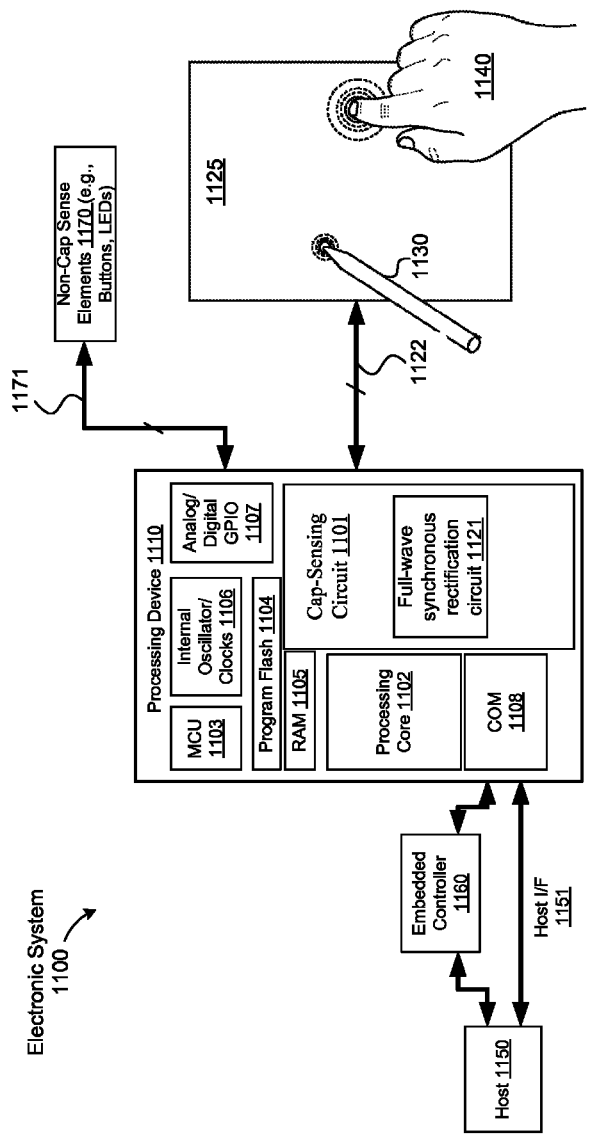
FIG. 11 is a block diagram illustrating one embodiment of an electronic system having a processing device with full-wave synchronous rectification self-capacitance sensing.

FIG. 11 is a block diagram illustrating one embodiment of an electronic system 1100 having a processing device 1110 with full-wave synchronous rectification self-capacitance sensing. The capacitance-sensing circuit 1101 includes full-wave synchronous rectification circuit 1121. Details regarding the full-wave synchronous rectification circuit 1121 are described in more detail with respect to FIGS. 1, 4, and 9. The processing device 1110 is configured to detect one or more touches proximate a touch-sensing device, such as the capacitive-sense array 1125. The processing device can detect conductive objects, such as touch objects 1140 (fingers or passive styluses, an active stylus 1130, or any combination thereof. The capacitance-sensing circuit 1101 can measure touch data on the capacitive-sense array 1125. The touch data may be represented as multiple cells, each cell representing an intersection of sense elements (e.g., electrodes) of the capacitive-sense array 1125. In another embodiment, the touch data is a 2D capacitive image of the capacitive-sense array 1125. In one embodiment, when the capacitance-sensing circuit 1101 measures mutual capacitance of the touch-sensing device (e.g., capacitive-sense array 1125), the capacitance-sensing circuit 1101 obtains a 2D capacitive image of the touch-sensing device and processes the data for peaks and positional information. In another embodiment, the processing device 1110 is a microcontroller that obtains a capacitance touch signal data set, such as from a sense array, and finger detection firmware executing on the microcontroller identifies data set areas that indicate touches, detects and processes peaks, calculates the coordinates, or any combination therefore. The firmware identifies the peaks using the embodiments described herein. The firmware can calculate a precise coordinate for the resulting peaks. In one embodiment, the firmware can calculate the precise coordinates for the resulting peaks using a centroid algorithm, which calculates a centroid of the touch, the centroid being a center of mass of the touch. The centroid may be an X/Y coordinate of the touch. Alternatively, other coordinate interpolation algorithms may be used to determine the coordinates of the resulting peaks. The microcontroller can report the precise coordinates to a host processor, as well as other information.

Electronic system 1100 includes processing device 1110, capacitive-sense array 1125, stylus 1130, host processor 1150, embedded controller 1160, and non-capacitive sense elements 1170. The capacitive sense elements are electrodes of conductive material, such as copper. The sense elements may also be part of an ITO panel. The capacitive sense elements can be configurable to allow the capacitive-sensing circuit 1101 to measure self-capacitance, mutual capacitance, or any combination thereof. In the depicted embodiment, the electronic system 1100 includes the capacitive-sense array 1125 coupled to the processing device 1110 via bus 1122. The capacitive-sense array 1125 may include a multi-dimension capacitive-sense array. The multi-dimension sense array includes multiple sense elements, organized as rows and columns. In another embodiment, the capacitive-sense array 1125 operates as an all-points-addressable ("APA") mutual capacitive-sense array. In another embodiment, the capacitive-sense array 1125 operates as a coupled-charge receiver. In another embodiment, the capacitive-sense array 1125 is non-transparent capacitive-sense array (e.g., PC touchpad). The capacitive-sense array 1125 may be disposed to have a flat surface profile. Alternatively, the capacitive-sense array 1125 may have non-flat surface profiles. Alternatively, other configurations of capacitive-sense arrays may be used. For example, instead of vertical columns and horizontal rows, the capacitive-sense array 1125 may have a hexagon arrangement, or the like, as would be appreciated by one of ordinary skill in the art having the benefit of this disclosure. In one embodiment, the capacitive-sense array 1125 may be included in an ITO panel or a touch screen panel.

The operations and configurations of the processing device 1110 and the capacitive-sense array 1125 for detecting and tracking the touch object 1140 and stylus 1130 are described herein. In short, the processing device 1110 is configurable to detect a presence of the touch object 1140, a presence of a stylus 1130 on the capacitive-sense array 1125, or any combination thereof. The processing device 1110 may detect and track the stylus 1130 and the touch object 1140 individually on the capacitive-sense array 1125. In one embodiment, the processing device 1110 can detect and track both the stylus 1130 and touch object 1140 concurrently on the capacitive-sense array 1125. If the touching object is an active stylus, in one embodiment, the active stylus 1130 is configurable to operate as the timing "master," and the processing device 1110 adjusts the timing of the capacitive-sense array 1125 to match that of the active stylus 1130 when the active stylus 1130 is in use. In one embodiment, the capacitive-sense array 1125 capacitively couples with the active stylus 1130, as opposed to conventional inductive stylus applications. It should also be noted that the same assembly used for the capacitive-sense array 1125, which is configurable to detect touch objects 1140, is also used to detect and track a stylus 1130 without an additional PCB layer for inductively tracking the active stylus 1130.

In the depicted embodiment, the processing device 1110 includes analog and/or digital general purpose input/output ("GPIO") ports 1107. GPIO ports 1107 may be programmable. GPIO ports 1107 may be coupled to a Programmable Interconnect and Logic ("PIL"), which acts as an interconnect between GPIO ports 1107 and a digital block array of the processing device 1110 (not shown). The digital block array may be configurable to implement a variety of digital logic circuits (e.g., DACs, digital filters, or digital control systems) using, in one embodiment, configurable user modules ("UMs"). The digital block array may be coupled to a system bus. Processing device 1110 may also include memory, such as random access memory ("RAM") 1105 and program flash 1104. RAM 1105 may be static RAM ("SRAM"), and program flash 1104 may be a non-volatile storage, which may be used to store firmware (e.g., control algorithms executable by processing core 1102 to implement operations described herein). Processing device 1110 may also include a memory controller unit ("MCU") 1103 coupled to memory and the processing core 1102. The processing core 1102 is a processing element configured to execute instructions or perform operations. The processing device 1110 may include other processing elements as would be appreciated by one of ordinary skill in the art having the benefit of this disclosure. It should also be noted that the memory may be internal to the processing device or external to it. In the case of the memory being internal, the memory may be coupled to a processing element, such as the processing core 1102. In the case of the memory being external to the processing device, the processing device is coupled to the other device in which the memory resides as would be appreciated by one of ordinary skill in the art having the benefit of this disclosure.

The processing device 1110 may also include an analog block array (not shown). The analog block array is also coupled to the system bus. Analog block array may also be configurable to implement a variety of analog circuits (e.g., ADCs or analog filters) using, in one embodiment, configurable UMs. The analog block array may also be coupled to the GPIO 1107.

As illustrated, capacitance-sensing circuit 1101 may be integrated into processing device 1110. Capacitance-sensing circuit 1101 may include analog I/O for coupling to an external component, such as touch-sensor pad (not shown), capacitive-sense array 1125, touch-sensor slider (not shown), touch-sensor buttons (not shown), and/or other devices. The capacitance-sensing circuit 1101 may be configurable to measure capacitance using mutual-capacitance sensing techniques, self-capacitance sensing technique, charge coupling techniques, or the like. In one embodiment, capacitance-sensing circuit 1101 operates using a charge accumulation circuit, a capacitance modulation circuit, or other capacitance sensing methods known by those skilled in the art. In an embodiment, the capacitance-sensing circuit 1101 is of the Cypress TMA-3xx, TMA-4xx, or TMA-xx families of touch screen controllers. Alternatively, other capacitance-sensing circuits may be used. The mutual capacitive-sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance-sensing circuit 1101 in any chosen combination. In one embodiment, the TX and RX electrodes of the sense array 1125 are configurable to operate as a TX and RX electrodes of a mutual capacitive-sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive-sense array, instead of measuring a mutual capacitance at an intersection of a RX electrode and a TX electrode (a sense element) as done during mutual-capacitance sensing. An intersection between two sense elements may be understood as a location at which one sense electrode crosses over or overlaps another, while maintaining galvanic isolation from each other. The capacitance-sensing circuit 1101 does not use mutual-capacitance or self-capacitance sensing to measure capacitances of the sense elements when performing a stylus sensing. Rather, the capacitance-sensing circuit 1101 measures a charge that is capacitively coupled between the sense array 1125 and the stylus as described herein. The capacitance associated with the intersection between a TX electrode and an RX electrode can be sensed by selecting every available combination of TX electrode and RX electrode. When a touch object, such as a finger or stylus, approaches the capacitive-sense array 1125, the object causes a decrease in mutual capacitance between some of the TX/RX electrodes. In another embodiment, the presence of a finger increases the coupling capacitance of the electrodes. Thus, the location of the finger on the capacitive-sense array 1125 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of coordinate interpolation algorithms may be used to detect the center of the touch as would be appreciated by one of ordinary skill in the art having the benefit of this disclosure.

In an embodiment, the electronic system 1100 may also include non-capacitive sense elements 1170 coupled to the processing device 1110 via bus 1171 and GPIO port 1107. The non-capacitive sense elements 1170 may include buttons, light emitting diodes ("LEDs"), and other user interface devices, such as a mouse, a keyboard, or other functional keys that do not use capacitance sensing. In one embodiment, buses 1122, and 1171 are embodied in a single bus. Alternatively, these buses may be configured into any combination of one or more separate buses.

Processing device 1110 may include internal oscillator/clocks 1106 and communication block ("COM") 1108. In another embodiment, the processing device 1110 includes a spread spectrum clock (not shown). The oscillator/clocks block 1106 provides clock signals to one or more of the components of processing device 1110. Communication block 1108 may be used to communicate with an external component, such as a host processor 1150, via host interface ("I/F") line 1151. Alternatively, processing device 1110 may also be coupled to embedded controller 1160 to communicate with the external components, such as host processor 1150. In one embodiment, the processing device 1110 is configurable to communicate with the embedded controller 1160 or the host processor 1150 to send and/or receive data.

Processing device 1110 may reside on a common carrier substrate such as, for example, an integrated circuit ("IC") die substrate, a multi-chip module substrate, or the like. Alternatively, the components of processing device 1110 may be one or more separate integrated circuits and/or discrete components. In one exemplary embodiment, processing device 1110 is the Programmable System on a Chip (PSoC®) processing device, developed by Cypress Semiconductor Corporation, San Jose, Calif. Alternatively, processing device 1110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 1110 may be done in the host.

Capacitance-sensing circuit 1101 may be integrated into the IC of the processing device 1110, or alternatively, in a separate IC. Alternatively, descriptions of capacitance-sensing circuit 1101 may be generated and compiled for incorporation into other integrated circuits. For example, behavioral level code describing the capacitance-sensing circuit 1101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 1101.

It should be noted that the components of electronic system 1100 may include all the components described above. Alternatively, electronic system 1100 may include some of the components described above.

In one embodiment, the electronic system 1100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

The embodiments described herein may be used in various designs of mutual-capacitance sensing arrays of the capacitance sensing system, or in self-capacitance sensing arrays. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "measuring," "generating," "sampling," "converting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

In the above description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. It should be noted that the term capacitor, as used herein, may refer to any combination of conductors and dielectrics that produce a capacitance between the conductors, as well as discrete components. For example, as described herein, a capacitance can created as an intersection between two electrodes. An intersection between the first electrode and second electrode is also called a sensor. An intersection between two sense elements (electrodes) may be understood as a location at which one sense electrode crosses over or overlaps another, while maintaining galvanic isolation from each other. In other cases, a discrete capacitor may be used to produce a capacitance.

What is claimed is:

1. An apparatus comprising:
a first integrating capacitor;
a first modulator operatively coupled to the first integrating capacitor;
a second integrating capacitor; and
a second modulator operatively coupled to the second integrating capacitor, wherein the first modulator in conjunction with the first integrating capacitor and the second modulator in conjunction with the second integrating capacitor measure a self-capacitance of a capacitive-sense array by performing a full-wave synchronous rectification.

2. The apparatus of claim 1, further comprising:
a self-capacitance sensing channel to measure the self-capacitance of the capacitive-sense array, the capacitive-sense array comprising a plurality of electrodes, the self-capacitance sensing channel comprising:
the first modulator, the first integrating capacitor and the first modulator to generate a first measurement of the self-capacitance of the capacitive-sense array, the first measurement corresponding to a first half-wave of a full-wave signal; and
the second modulator, the second integrating capacitor and the second modulator to generate a second measurement of the self-capacitance of the capacitive-sense array, the second measurement corresponding to a second half-wave of the full-wave signal, wherein the first measurement and the second measurement are used to determine the self-capacitance of the capacitive-sense array.

3. The apparatus of claim 2, further comprising:
a converter operatively coupled to a first output of the first modulator and the output of the second modulator, the converter to convert the first measurement and the second measurement into a digital value representative of the self-capacitance of the capacitive-sense array.

4. The apparatus of claim 1, wherein the first modulator and the second modulator are sigma-delta modulators.

5. The apparatus of claim 1, further comprising:
a first switch operatively interposed between an electrode of the capacitive-sense array and the first integrating capacitor; and a second switch operatively interposed between the electrode of the capacitive-sense array and the second integrating capacitor, the first switch and the second switch to alternately couple the first integrating capacitor or the second integrating capacitor to the self-capacitance during a full-wave signal of the full-wave synchronous rectification.

6. The apparatus of claim 5, wherein the first switch and the second switch are non-overlapping switches, wherein the first switch is closed when the second switch is open or the second switch is closed when the first switch is open.

7. The apparatus of claim 1, wherein the first modulator comprises:
a first comparator comprising a first comparator input, a second comparator input, and a first comparator output, the first comparator input operatively coupled to the first integrating capacitor;
a first reference voltage source operatively coupled to the second comparator input;
a first latch comprising a first latch input and a first latch output, the first latch input operatively coupled to the first comparator output; and
a first current source operatively coupled to the first comparator input and the first integrating capacitor, the first current source controlled in a feedback configuration with the first latch output.

8. The apparatus of claim 1, wherein the second modulator comprises:
a second comparator comprising a third comparator input, a fourth comparator input and a second comparator output, the third comparator input operatively coupled to the second integrating capacitor;
a second reference voltage source operatively coupled to the fourth comparator input;
a second latch comprising a second latch input and a second latch output, the second latch input operatively coupled to the second comparator output; and
a second current source operatively coupled to the third comparator input and the second integrating capacitor, the second current source controlled in a feedback configuration with the second latch output.

9. The apparatus of claim 2, wherein
the first modulator to generate the first measurement by measuring a charge current on the first integrating capacitor, the charge current corresponding to the first half-wave of the full-wave signal and indicative of a self-capacitance of a capacitive-sense array, and
the second modulator to generate the second measurement by measuring a discharge current on the second integrating capacitor, the discharge current corresponding to the second half-wave of the full-wave signal and indicative of the self-capacitance of the capacitive-sense array.

10. The apparatus of claim 2, wherein the full-wave signal comprises the first half-wave subsequently followed by the second half-wave, the first half-wave being approximately an inverse of the second half-wave.

11. An apparatus comprising:
a capacitive-sense array comprising a plurality of electrodes, the capacitive-sense array to detect a touch proximate the plurality of electrodes;
a first integrating capacitor;
a second integrating capacitor; and
one or more modulators operatively coupled to the first integrating capacitor and the second integrating capacitor, wherein the one or more modulators in conjunction with the first integrating capacitor and the second integrating capacitor measure a self-capacitance of a capacitive-sense array by performing a full-wave synchronous rectification.

12. The apparatus of claim 11, further comprising:
a capacitance-sensing circuit coupled to the capacitive sense array, the capacitance-sensing circuit comprising a self-capacitance channel to measure the self-capacitance of the capacitive-sense array, the self-capacitance channel comprising:
the one or more modulators, wherein the one or more modulators and the first integrating capacitor generate a first measurement of the self-capacitance of the capacitive-sense array, the first measurement corresponding to a first half-wave of a full-wave signal, wherein the one or more modulators and the second integrating capacitor generate a second measurement of the self-capacitance of the capacitive-sense array, the second measurement corresponding to a second half-wave of the full-wave signal, wherein the first measurement and the second measurement are used to determine the self-capacitance of the capacitive-sense array.

13. The apparatus of claim 12, further comprising:
a converter operatively coupled to an output of the one or more modulators, the converter to convert the first measurement and the second measurement into a digital value representative of the self-capacitance of the capacitive-sense array.

14. The apparatus of claim 12, the self-capacitance channel further comprising:
a first switch operatively interposed between an electrode of the capacitive-sense array and the first integrating capacitor; and
a second switch operatively interposed between the electrode of the capacitive-sense array and the second integrating capacitor, the first switch and the second switch to alternately couple the first integrating capacitor or the second integrating capacitor to the self-capacitance during the full-wave signal.

15. The apparatus of claim 11, wherein the one or more modulators comprises:
a comparator comprising a first comparator input, a second comparator input, and a comparator output, the first comparator input alternately coupled to the first integrating capacitor or the second integrating capacitor;
a first reference voltage source;
a second voltage source, the first voltage source or the second voltage source alternately coupled to the second comparator input;
a state machine comprising a state machine input and a first state machine output and a second state machine output, the state machine input operatively coupled to the comparator output;
a first current source; and
a second current source, the first current source or the second current source alternately coupled to the first comparator input, the first current source and the second current source controlled in a feedback configuration with the state machine.

16. The apparatus of claim 12, wherein
the one or more modulators to generate the first measurement by measuring a charge current on the first integrating capacitor, the charge current corresponding to the first half-wave of the full-wave signal and indicative of a self-capacitance of a capacitive-sense array, the one or more modulators to generate the second measurement by measuring a discharge current on the second integrating capacitor, the discharge current corresponding to the second half-wave of the full-wave signal and indicative of the self-capacitance of the capacitive-sense array.

17. A method comprising:
measuring a self-capacitance of a capacitive-sense array by performing a full-wave synchronous rectification using a first integrating capacitor corresponding to a first modulator and a second integrating capacitor corresponding to a second modulator, wherein the capacitive sense array comprises a plurality of electrodes; and
generating, responsive to the measuring, a first measurement and a second measurement indicative of the self-capacitance of the capacitive-sense array.

18. The method of claim 17, wherein measuring the self-capacitance of the capacitive-sense array by performing the full-wave synchronous rectification comprises:
measuring, by the first modulator, a charge current on the first integrating capacitor to generate the first measurement, the charge current corresponding to a first half-wave of a full-wave signal; and
measuring, by a second modulator, a discharge current on the second integrating capacitor to generate the second measurement, the discharge current corresponding to a second half-wave of the full-wave signal.

19. The method of claim 18, wherein measuring the self-capacitance of the capacitive-sense array by performing the full-wave synchronous rectification comprises:
sampling, by the first integrating capacitor, a first charge associated with the self-capacitance of the capacitive sense array when the second modulator is measuring the discharge current on the second integrating capacitor; and
sampling, by the second integrating capacitor, a second charge associated with the self-capacitance of the capacitive sense array when the first modulator is measuring the charge current.

20. The method of claim 17, further comprising:
generating, by a converter operatively coupled to the first modulator and the second modulator, a digital value representative of the self-capacitance of the capacitive-sense array in view of the first measurement and the second measurement.

* * * * *